United States Patent [19]

Okada et al.

[11] Patent Number: 5,355,175
[45] Date of Patent: Oct. 11, 1994

[54] VIDEO MIXING APPARATUS CAPABLE OF COMBINING TWO INPUT SIGNALS AND VARYING THE MIXING RATIO LINE BY LINE

[75] Inventors: Setsuo Okada, Sapporo; Noriyoshi Takeya, Tokorozawa; Manabu Okamoto, Tokorozawa; Yoshinobu Nagase, Tokorozawa; Takashi Yoshimi, Tokorozawa; Hitoshi Yamazaki, Tokorozawa; Hiroyasu Matsuura, Tokorozawa; Masakazu Miyazaki, Tokorozawa; Yoshiki Furuta, Tokorozawa; Masahiro Sui, Tokorozawa; Hirofumi Matoba, Tokorozawa, all of Japan

[73] Assignees: Hudson Soft Co., Ltd, Sapporo; Pioneer Electronic Corp., Tokyo, Japan

[21] Appl. No.: 71,014

[22] Filed: Jun. 2, 1993

[30] Foreign Application Priority Data

Jun. 3, 1992 [JP] Japan .................................. 4-143039

[51] Int. Cl.⁵ ............................................. H04N 5/265
[52] U.S. Cl. ...................................... 348/595; 348/659
[58] Field of Search ................ 358/22, 182, 183, 335; 348/595, 586, 659, 594; H04N 5/262, 5/265, 9/74

[56] References Cited

U.S. PATENT DOCUMENTS

| | | | |
|---|---|---|---|
| 4,680,622 | 7/1987 | Barnes et al. | 358/22 |
| 5,027,213 | 6/1991 | Kamin | 358/183 |
| 5,097,349 | 3/1992 | Nomura et al. | 358/335 |
| 5,168,363 | 12/1992 | Kojima et al. | 358/183 |
| 5,220,433 | 6/1993 | Mogamiya et al. | 358/310 |

Primary Examiner—Mark R. Powell
Assistant Examiner—Cheryl Cohen
Attorney, Agent, or Firm—Fish & Richardson

[57] ABSTRACT

A video mixing apparatus mixes a graphics video image and a playback video image at a plurality of mixture ratios in one image plane. Fade data indicative of the mixing ratio of at least one line of the playback video signal and the graphics video signal is sequentially generated in accordance with a predetermined order. The fade data is held into holding means and is outputted from the holding means synchronously with a horizontal sync signal. The levels of the playback video signal and the graphics video signal are individually adjusted in accordance with the fade data outputted from the holding means and the adjusted signals are added. The playback video signal and the graphics video signal are mixed at the mixing ratio set every line of one image plane. In a video apparatus using the graphics video image and playback video image, various kinds of effective video images can be formed by mixing the graphics video image of every video image such as background, person, characters, or the like and the playback video image.

3 Claims, 6 Drawing Sheets

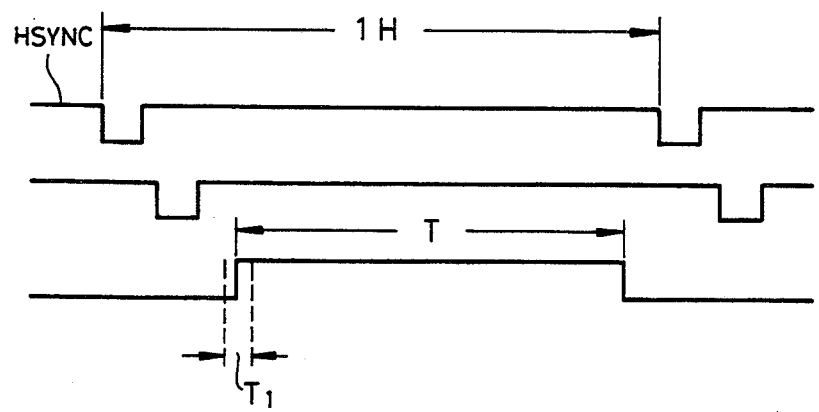
FIG. 2A
FIG. 2B
FIG. 2C
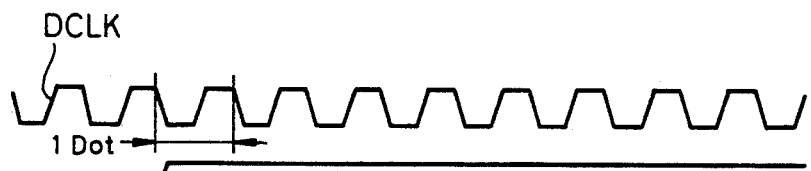
FIG. 3A
FIG. 3B
FIG. 3C
FIG. 3D

FIG. 4A HSYNC
FIG. 4B FA
FIG. 4C FB
FIG. 4D FC
FIG. 4E FA
FIG. 4F FB
FIG. 4G FC

VD8

LOGICAL OR OF VD0 – DV7

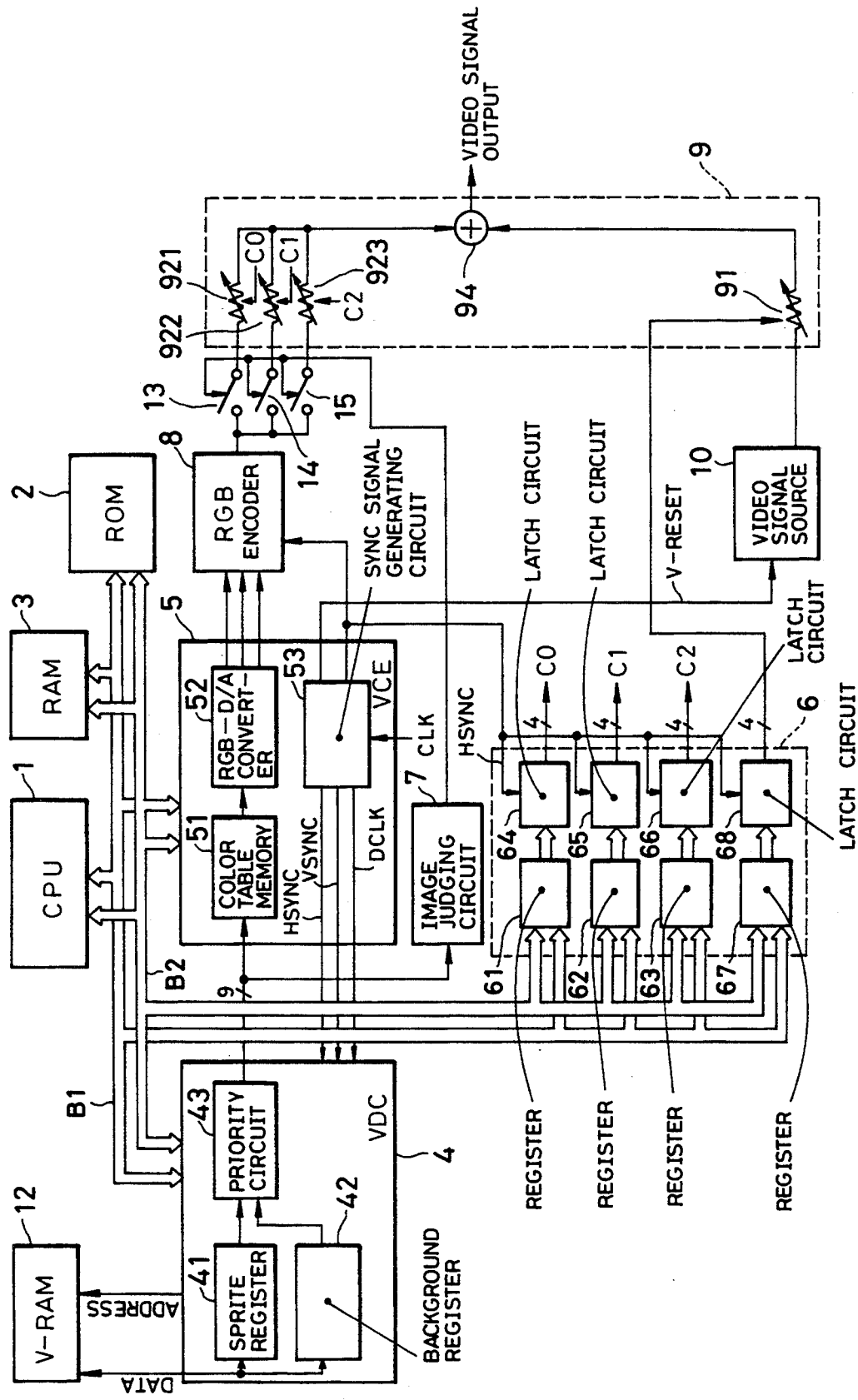

VIDEO MIXING APPARATUS CAPABLE OF COMBINING TWO INPUT SIGNALS AND VARYING THE MIXING RATIO LINE BY LINE

BACKGROUND OF THE INVENTION

1. Field of the Invention

The present invention relates to a video mixing apparatus for mixing a playback video signal obtained by playing a recording medium and a graphics video signal obtained based on a data processing.

2. Description of Background Information

An apparatus for mixing a playback video signal indicative of a moving image or a still image, obtained by playing a recording medium such as a video disk or the like, and a graphics video signal indicative of a graphics video image based on graphics data obtained as a subcode signal. Such apparatus are disclosed, for example, in Japanese Patent Application Kokai No. 1-256071. In the video mixing apparatus disclosed in this document, the playback video signal and the graphics video signal are adjusted individually through a variable resistor and added together. Resistance values of the variable resistors are manually changed so that a mixing ratio of the playback video signal and the graphics video signal is arbitrarily determined.

In such a conventional video mixing apparatus, however, a graphics video image and a playback video image are mixed at the same mixing ratio on one screen. That is, the above apparatus is not designed so that a part of one image plane of a graphics video image and the other portion thereof can be mixed at different mixing ratios into a playback video image or so that a part of one image plane of a playback video image and the other portion thereof can be mixed at different mixing ratios into a graphics video image. This means that in a television game apparatus using a graphics video image, it is impossible to form several video images by mixing a graphics video image of every video image such as background, person, characters, or the like, and a playback video image.

OBJECT AND SUMMARY OF THE INVENTION

It is, therefore, an object of the present invention to provide a video mixing apparatus which can mix a graphics video image and a playback video image at a plurality of mixing ratios in one image plane.

According to the present invention, a video mixing apparatus for mixing a playback video signal obtained by playing a recording medium and a graphics video signal obtained on the basis of a result of processing of data processing means, is provided the apparatus is comprised of fade data generating means for sequentially generating fade data indicative of a mixing ratio of at least one line of the playback video signal and the graphics video signal in accordance with a predetermined order; holding means for holding the fade data which is sequentially generated from the fade data generating means and for generating the fade data synchronously with a horizontal sync signal; and means for individually adjusting the levels of the playback video signal and the graphics video signal in accordance with the fade data generated from the holding means and for adding those adjusted signals.

In the video mixing apparatus of the invention, the fade data indicative of the mixing ratio of at least one line of the playback video signal and the graphics video signal are sequentially generated in accordance with a predetermined order. The fade data is held in the holding means and is output from the holding means synchronously with a horizontal sync signal. In accordance with the fade data supplied from the holding means, the levels of the playback video signal and the graphics video signal are individually. Then, the adjusted signals are added together. The playback video signal and the graphics video signal are, consequently, mixed at the mixing ratio set for each line of one image plane.

BRIEF DESCRIPTION OF THE DRAWINGS

FIGS. 2A, 2B, and 2C are diagrams showing operation waveforms in each portion of an apparatus of FIG. 1;

FIGS. 3A, 3B, 3C, and 3D are diagrams showing operation waveforms in each portion of the apparatus of FIG. 1;

FIGS. 4A, 4B, 4C, 4D, 4E, 4F, and 4G are diagrams showing operating states in each portion of the apparatus of FIG. 1;

FIG. 7 is a block diagram showing another embodiment of the invention.

DETAILED DESCRIPTION OF PREFERRED EMBODIMENTS

Embodiments of the present invention will be described in detail hereinbelow with reference to the drawings.

Figure 1:
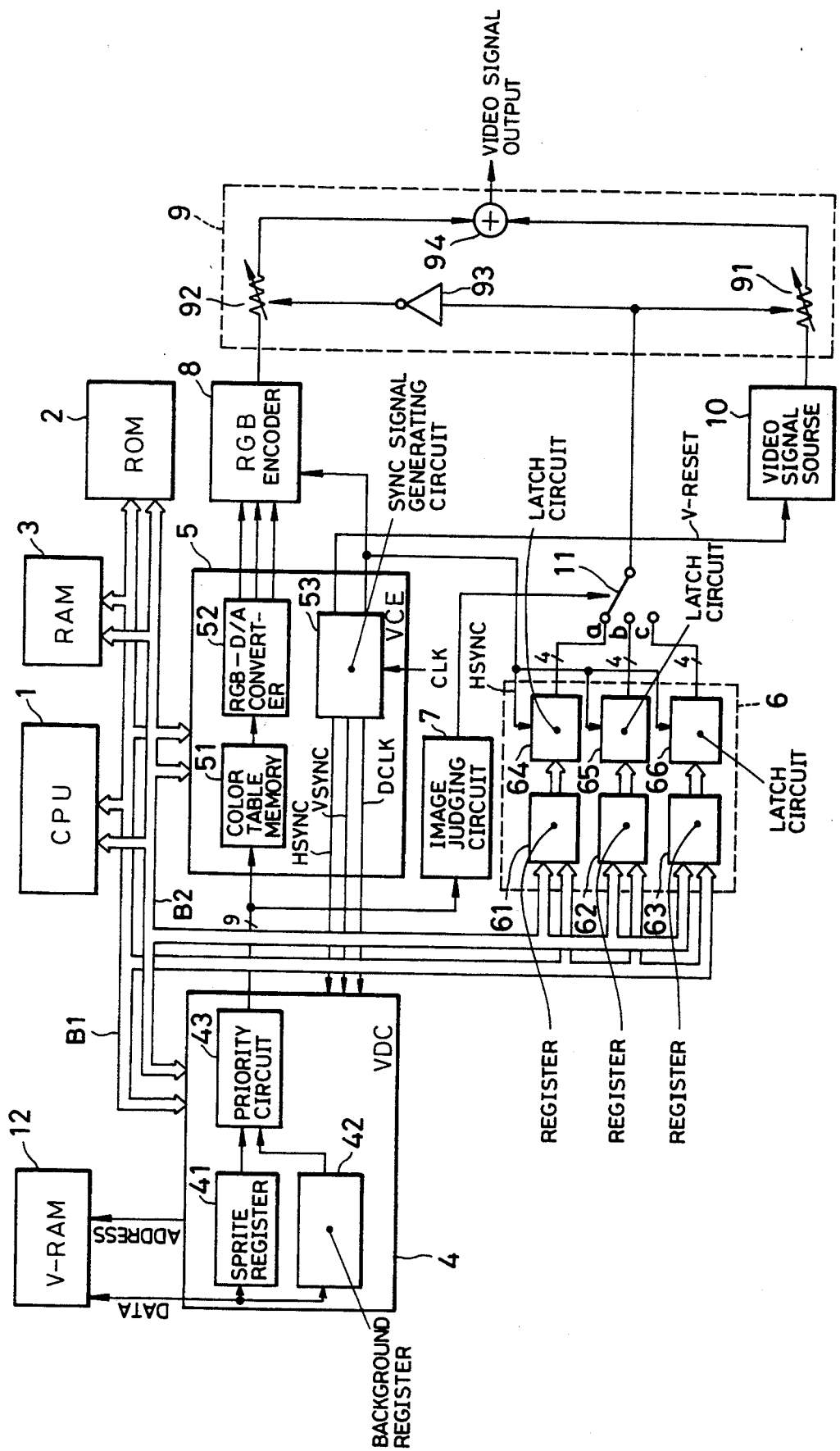
FIG. 1 is a block diagram showing an embodiment of the present invention.

FIG. 1 shows a video apparatus which is an embodiment of a video mixing apparatus according to the invention is applied. In such a video apparatus, a common data bus $B_1$ and a common address bus $B_2$ are provided. A CPU 1, a ROM 2, a RAM 3, a VDC (Video Display Controller) 4, a VCE (Video Control Encoder) 5, and a data selector 6 are connected to the buses $B_1$ and $B_2$. The CPU 1 controls the video apparatus, and outputs commands and data to the buses $B_1$ and $B_2$ in accordance with a program which was previously written in ROM 2. ROM 2 is detachably provided in the video apparatus to store not only one or a plurality of programs, but also data, such as character data, fade data, and the like, which are required by the programs written in the ROM 2. The data read from the ROM 2 or the processed data are temporarily stored in the RAM 3. The VDC 4 writes data into a V-RAM (Video RAM) 12 or reads necessary image data from the V-RAM 12 and outputs the read image data in accordance with a command from the CPU 1.

A sprite register 41, a background register 42, and a priority circuit 43 are provided in the VDC 4. Image data of eight bits indicative of a character video image such as person, characters, or the like, is read from the V-RAM 12 and held in the sprite register 41 dot by dot. Image data of eight bits indicative of a background video image is read from the V-RAM 12 and held in the background register 42 dot by dot. The priority circuit 43 selectively outputs either of the image data held in the registers 41 and 42 in accordance with the priority indicated by a priority signal supplied by the CPU 1. The image data held in the sprite register 41 is the data from screen A of a character image among the graphics video images comprising three screens. The image data held in the background register 42 is the data from either screen or screens B C with respect to the background image. As shown in Table 1, all of image data $VD_0$ to $VD_7$ of the screen C are equal to 0. The image data $VD_0$ to $VD_7$ of the screens A and B are different as shown by reference character "X". The image data are not all equal to 0 and are not constant. The most significant bit $VD_8$ is set to "1" for the screen A of the character video image and is set to "0" for screens B and C of the background image. The most significant bit $VD_8$ is added when data is output to each of the registers 41 and 42. The image data is, consequently, supplied from the VDC 4 to the VCE 5 and an image judging circuit 7 as 9-bit data. A specific construction of the VDC 4 is described in Japanese Patent Application Kokai No. 64-78319.

TABLE 1

| screen | VD8 | VD7 | VD6 | VD5 | VD4 | VD3 | VD2 | VD1 | VD0 |
|---|---|---|---|---|---|---|---|---|---|
| A | 1 | X | X | X | X | X | X | X | X |
| B | 0 | X | X | X | X | X | X | X | X |
| C | 0 | 0 | 0 | 0 | 0 | 0 | 0 | 0 | 0 |

The VCE 5 has a color table memory 51, an RGB-D/A converting circuit 52, and a sync signal generating circuit 53. The color table memory 51 is constructed by a ROM which forms a color table in which RGB data of, for example, 256 colors indicative of color tones corresponding to the image data have been stored. The RGB data corresponding to the image data output from the VDC 4 is supplied by the memory 51 to the RGB-D/A converter circuit 52. The RGB-D/A converter circuit 52 converts the RGB data into an analog RGB signal. The sync signal generating circuit 53 is constructed by a frequency divider the sync signal generating circuit 53 also divides a reference clock signal CLK and generates a horizontal sync signal HSYNC, a vertical sync signal VSYNC, and a dot clock signal DCLK of one pixel unit. Those signals are supplied as timing signals to the VDC 4. The horizontal sync signal HSYNC is supplied from the sync signal generating circuit 53 to the data selector 6 and RGB encoder 8. A reset signal V-RESET according to the vertical sync signal VSYNC is also supplied to a video signal source 10.

The analog RGB signal output from the RGB-D/A converter circuit 52 is supplied to an RGB encoder 8. The RGB encoder 8 converts the analog RGB signal into the composite video signal in response to the horizontal sync signal, HSYNC. The video signal after completion of the conversion, is supplied as a graphics video signal to a mixing circuit 9. The mixing circuit 9 is comprised of an attenuator (ATT) 91 to attenuate the playback video signal from a video signal source 10, such as a video disk player or the like; an ATT 92 to attenuate the graphics video signal from the encoder 8; an invertor 93 to invert the fade data which has been relayed by a change-over switch 11, (to be explained hereinbelow;) and an adder 94 to add output video signals of the ATTs 91 and 92. The degree of attenuation by ATT 91 changes in accordance with the fade data supplied. The degree of attenuation by ATT 92 changes in accordance with the data inverted by the invertor 93. The output signals of the ATTs 91 and 92 are supplied to a CRT display (not shown) through the adder 94. Each of the ATTs 91 and 92 is, for example, constructed of a VCA (Voltage Controlled Amplifier) provided on a video signal line; and a D/A converter for converting the fade data or the like into the analog signal and supplying the analog signal as a control voltage to the VCA.

The data selector 6 has three registers 61, 62, 63 which correspond to screens A, B, C and latch circuits 64, 65, and 66 connected to the registers 61, 62, and 63. Fade data and address data are supplied from the CPU 1 to the registers 61, 62, and 63 through the data bus $B_1$ and address bus $B_2$. The fade data are held in the register designated by the address data. The fade data held in the registers 61, 62, and 63 are also held in the corresponding latch circuits 64, 65, and 66 in response to the horizontal sync signal HSYNC. The change-over switch 11 is connected to outputs of the latch circuits 64, 65, and 66. The switch 11 relays and transfers the fade data held in one of the latch circuits 64, 65, and 66 to the mixing circuit 9.

The image judging circuit 7 determines to which one of the screens A, B, and C that the 9-bit image data that is supplied corresponds. For example, the image judging circuit 7 is constructed by an OR circuit to get the OR of the bits of $VD_0$ to $VD_7$ of the image data $VD_0$ to $VD_8$. Two bits of an output of the OR circuit and $VD_8$ are output as an output signal. This output signal is used as a control signal for the change-over switch 11.

In such a construction, the CPU 1 first reads the color data indicative of the display color and the character data of a person or the like from the ROM 2 in accordance with the program data derived from the ROM 2. The CPU 1 supplies the color data and character data to the VDC 4 with the address data. The VDC 4 allows the data to be stored at the memory location in the V-RAM 12 that is designated by the corresponding address data supplied.

In the VDC 4, the pattern number and sprite color that are stored in a sprite attribute table buffer (not shown) are read. The color data and character data are read from the memory locations in the V-RAM 12 based on the pattern number and sprite color, and held as image data of one dot in the sprite register 41. The address data is obtained from the raster position. The color data and character data in the V-RAM 12 that correspond to the address data, are obtained. Additional data is derived from the address location determined by the character data. The data are held together with the color data into the background register 42 as image data of one dot. The image data $VD_0$ to $VD_7$ held in the sprite register 41 and background register 42 are updated, for instance, every dot clock and changed at any time. Since the practical operation about the data transfer between the VDC 4 and the V-RAM 12 has been disclosed in Japanese Patent Application Kokai No. 64-78319 (mentioned above), its detailed description of the operation is omitted here.

The CPU 1 generates a priority signal every dot clock signal DCLK in accordance with the program stored in the ROM 2. The priority circuit 43 selectively outputs either one of the image data held in the registers 41 and 42 in accordance with the priority shown by the priority signal. Since the $VD_8$ bit determines to which of the screens A, B, and C the data corresponds is added to the image data as mentioned above, when the data are output from each of the registers 41 and 42, the selected image data are output from the priority circuit 43 as nine bits $VD_0$ to $VD_8$.

In the case where the horizontal sync signal HSYNC is generated, as shown in FIG. 2A, is generated, as shown in FIG. 2B a color burst signal. FIG. 2C shows a period of time T which is displayed on the screen of the CRT display. FIG. 3 shows a change in image data of every dot in the portion of the period $T_1$ in FIG. 2. Specifically speaking, FIG. 3A shows the dot clock signal DCLK. FIG. 3B shows a period of time which is displayed on the screen of the CRT display in a manner similar to FIG. 2C. FIG. 3C shows a change in most significant bit $VD_8$ of the image data that are output from the priority circuit 43. FIG. 3D shows changes in bits $VD_0$ to $VD_7$ of the image data which are output from the priority circuit 43. That is, new image data $VD_0$ to $VD_8$ are output for every dot from the priority circuit 43.

The image data output from the VDC 4 is converted into the corresponding RGB data in accordance with the color table in the color table memory 51. The RGB data is then further converted into the analog RGB signal by the RGB-D/A converter circuit 52. The RGB signal is supplied as a graphics video signal to the mixing circuit 9 through the RGB encoder 8. The screens A, B, and C are discriminated in the image judging circuit 7 in accordance with the image data outputted from the VDC 4. The result of the discrimination is supplied to the change-over switch 11 as a switch change-over signal. When the image data indicates the screen A, the switch 11 is switched to a selection position a. When the image data indicates the screen B, the switch 11 is switched to a selection position b. When the image data indicates the screen C, the switch 11 is switched to a selection position c.

Figure 5A:
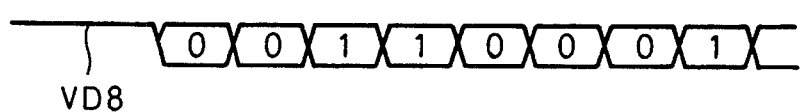
FIGS. 5A, 5B, and 5C are diagrams showing operating states in each portion of the apparatus of FIG. 1.
Figure 5B:
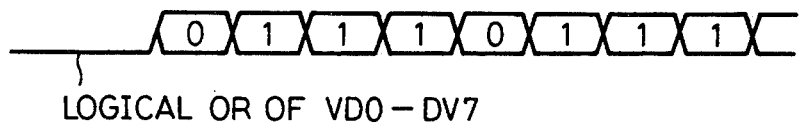
Figure 5C:

The CPU 1 supplies the fade data and address data to the data selector 6 in accordance with the program stored in the ROM 2. Therefore, the fade data is held in one of the registers 61, 62, and 63 that is designated by the address data and is updated by the fade data when the fade data has already been held in the register. As shown in FIGS. 4B, 4C, and 4D, fade data FA, FB, and FC are ordinarily supplied to the registers 61, 62, and 63 in one H period of time after the leading edge of the horizontal sync signal HSYNC (FIG. 4A) The data in the registers are changed. Since the horizontal sync signal HSYNC is supplied to the latch circuits 64, 65, and 66, the latch circuits 64, 65, and 66 receive the fade data FA, FB, and FC held in the corresponding registers 61, 62, and 63 in response to the leading edge of the horizontal sync signal HSYNC. The circuits update and hold the data in response to the leading edge of the horizontal sync signal HSYNC as shown in FIGS. 4E, 4F and 4G. Therefore, the data shown in the hatched portions in FIGS. 4B, 4C, and 4D are shifted as data in the hatched portions in FIGS. 4E, 4F, and 4G as shown by the arrows. In the case where, for example, the most significant bit $VD_8$ of the image data output from the VDC 4 changes every dot by the above updating operation as shown in FIG. 5A, or when the OR outputs of the bits $VD_0$ to $VD_7$ are changed every dot as shown in FIG. 5B, the fade data are changed to FA, FB, or FC, as shown in FIG. 5C. When there is no change in fade data held in the corresponding registers 61, 62, and 63, the contents of the fade data newly held in the latch circuits 64 65, and 66 are not changed.

One of the three fade data FA, FB, and FC are selected by the switch 11 and supplied to the mixing circuit 9. In addition to the graphics video signal and one of the fade data FA, FB, and FC, the playback video signal is supplied from the video signal source 10 to the mixing circuit 9. In the mixing circuit 9, the attenuation degree of the ATT 91 to attenuate the playback video signal is changed in accordance with the selected fade data. The attenuation degree of the ATT 92 to attenuate the graphics video signal is changed by the invertor 93 in accordance with the inverted data. Now, assuming that the fade data consists of four bits, as long as the fade data indicates "0000" as an opaque state, the degree of attenuation of ATT 92 is minimal and the attenuation degree of the ATT 91 is maximum. The graphics video signal is outputted as it is from the mixing circuit 9. When the fade data indicate "1111" as a complete transparent state, the attenuation degree of the ATT 92 is maximum and the attenuation degree of the ATT 91 is minimum. The playback video signal is output as it is from the mixing circuit 9. The larger the transparency degree of the fade data, the higher the attenuation degree of the ATT 92 and the lower attenuation degree of the ATT 91. The larger the transparency degree, the higher an overlap degree of the playback video image to the graphics image. The output signals of ATTs 91 and 92 are supplied to the CRT display through the adder 94. For example, the video image when a the graphics image is added to the playback video image, such as a moving image or the like, is displayed on the screen of the CRT display. In such a video image, the degree of mixing of the playback video image and the graphics image changes, at most, every one line in the screen. Further, since one of the screens A, B, and C is selected for every dot of the image plane with respect to the graphics image in one line of the image plane, it is possible that the fade data differs every dot. In such a case, a mixing degree of the playback video image and the graphics image changes for every dot.

Figure 6:
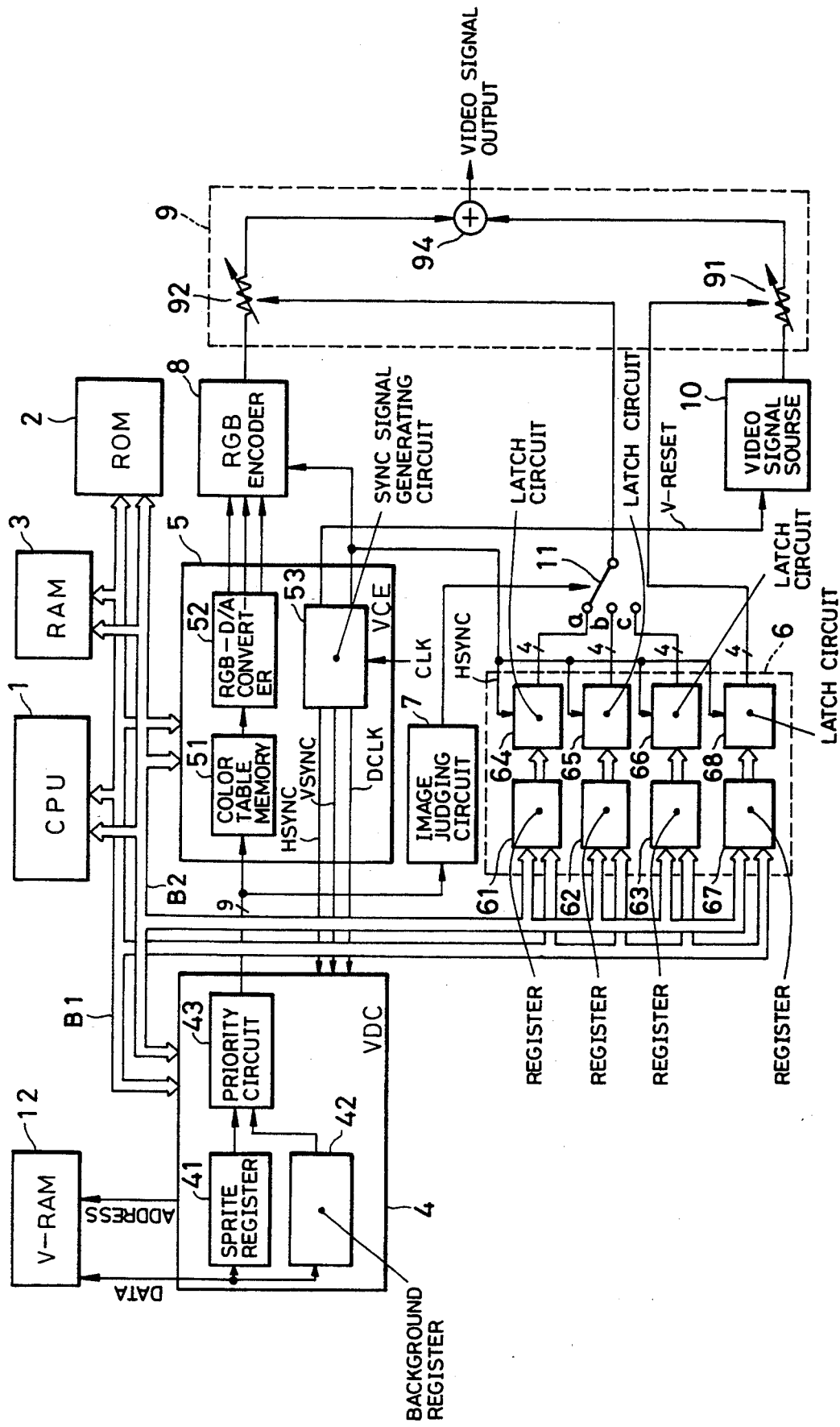
FIG. 6 is a block diagram showing another embodiment of the invention.

FIG. 6 shows another embodiment of the invention. In this video mixing apparatus, a register 67 and a latch circuit 68 are provided for the data selector 6 is addition to the registers 61, 62, and 63 and the latch circuits 64, 65, and 66. The registers 61, 62, and 63 and the latch circuits 64, 65,and 66 are used to hold the fade data for the graphics video signal. The register 67 and the latch circuit 68 are used to hold the fade data for the playback video signal. The relayed output from the switch 11 is directly supplied to the ATT 92. The output of the latch circuit 68 is supplied directly to the ATT 91. Therefore, the invertor 93 in the apparatus of FIG. 1 is not provided for the mixing circuit 9. The CPU 1 supplies the fade data and address data to the data selector 6 in accordance with the program stored in the ROM 2. The fade data, therefore, is held in one of the registers 61, 62, and 63 and 67 that is designated by the address data. When the fade data has already been held in such a register, it is updated by the fade data supplied. Each of the latch circuits 64, 65, and 66, and 68 receives the fade data held in the corresponding registers 61, 62, 63, 67 and updates and holds the received fade data in response to the leading edge of the horizontal sync signal HSYNC. The other operations are similar to those of the apparatus shown in FIG. 1. The fade data supplied to the ATT 91 and the fade data supplied to the ATT 92 at the same point in time are in an inverted relation similarly to those in the apparatus shown in FIG. 1. Operations are previously executed so that an inverted relation is attained between the respective fade data which are supplied to the data selector 6, at the processing state of the CPU 1 according to the program stored in the ROM 2.

FIG. 7 shows a still another embodiment of the invention. In this embodiment, three on/off switches 13, 14, and 15 are connected in parallel to an output of the RGB encoder 8. One of the on/off switches 13, 14, and 15 is turned on in response to the output signal of the image judging circuit 7. One of ATTs 921, 922, and 923 is connected to each output of the on/off switches 13, 14, and 15. The fade data held in the corresponding of the latch circuits 64, 65, and 66 of the data selector 6 is supplied to each of the ATTs 921, 922, and 923. The graphics video signal supplied through the switch in the on state of the on/off switches 13, 14, and 15 is, the attenuated by a corresponding ATTs 921, 922, and 923. The playback video signal is attenuated by the ATT 91 in accordance with the fade data held in the latch circuit 68. Those attenuated video signals are mixed by the adder 94 and the mixed signal is output. The other constructions are similar to those shown in FIG. 6.

According to the video mixing apparatus of the present invention as mentioned above, the fade data indicative of a mixing ratio of at least one line of the playback video signal and the graphics video signal is sequentially generated in accordance with a predetermined order. The fade data is held in the holding means and is output from the holding means synchronously with the horizontal sync signal. In accordance with the fade data output from the holding means, the levels of the playback video signal and graphics video signal are individually adjusted and the adjusted signals are added. The playback video signal and the graphics video signal are mixed at the mixture ratio set at every line of one image plane. In the video apparatus using the graphics video image, effective, various effective video images can be formed by mixing the graphics video image of every video image such as background, person, characters, or the like, and the playback video image.

What is claimed is:

1. A video mixing apparatus for mixing an analog video signal obtained from a recording medium and a graphics video signal having a plurality of screens, said apparatus comprising:

fade data generating means for generating fade data indicative of a mixing ratio between said analog video signal and each of said screens of said graphics video signal;

holding means for holding a plurality of fade data generated from said fade data generating means and for outputting the fade data synchronously with a horizontal sync signal, mixing means for individually adjusting levels of the playback video signal and the graphics video signal in accordance with the fade data outputted from said holding means and for additively mixing the adjusted signals, data generating means for generating one of a plurality of image data corresponding to said plurality of screens of said graphics video signal in accordance with a priority signal representing a priority order in reproduction of said screens;

means for converting said image data outputted from the data generating means into said graphics video signal; and discrimination means for judging to which one of said screens said image data outputted from said data generating means belongs, wherein said fade data generating means generates the fade data for each of said screens of said graphics video signal, and said holding means holds the fade data for each of said screens of said graphics video signal and supplies, to said mixing means, one of the plurality of fade data held according to the result of the discrimination by said discrimination means.

2. A video mixing apparatus for mixing an analog video signal and one screen of a graphics video signal comprising a plurality of screens to which a priority order of display is assigned, said one screen being included in said plurality of screens, said apparatus comprising:

means for supplying said analog video signal;

data generating means for generating graphics data which belongs to said one screen of said graphics video signal comprising said plurality of screens, according to said order of priority;

discriminating means for discriminating said one screen to which said graphics data belongs;

designating means for designating a mixing ratio between said screen discriminated by said discriminating means and said analog video signal; and mixing means for mixing said analog video signal with said one screen of said graphics video signal at said mixing ratio designated by said designating means.

3. The video mixing apparatus as claimed in claim 2, wherein said discriminating means discriminates said one screen by evaluating a bit arrangement of said graphics data.

* * * * *